(12) United States Patent
Zhang et al.

(10) Patent No.: US 10,318,826 B2
(45) Date of Patent: Jun. 11, 2019

(54) REAR OBSTACLE DETECTION AND DISTANCE ESTIMATION

(71) Applicant: Ford Global Technologies, LLC, Dearborn, MI (US)

(72) Inventors: Yi Zhang, Sunnyvale, CA (US); Vidya Nariyambut Murali, Sunnyvale, CA (US); Madeline J Goh, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 207 days.

(21) Appl. No.: 15/288,042

(22) Filed: Oct. 7, 2016

(65) Prior Publication Data

US 2018/0101739 A1    Apr. 12, 2018

(51) Int. Cl.
| | | |
|---|---|---|
| *H04N 9/47* | (2006.01) |
| *H04N 7/12* | (2006.01) |
| *G06K 9/00* | (2006.01) |
| *G06K 9/46* | (2006.01) |

(52) U.S. Cl.
CPC ....... *G06K 9/00805* (2013.01); *G06K 9/4671* (2013.01)

(58) Field of Classification Search
None
See application file for complete search history.

(56) References Cited

U.S. PATENT DOCUMENTS

| | | | |
|---|---|---|---|
| 7,446,798 B2 | 11/2008 | Comaniciu | |
| 8,711,221 B2 | 4/2014 | Eggert | |
| 9,070,202 B2 | 6/2015 | Chandraker | |
| 2013/0222589 A1* | 8/2013 | Lalonde | G08G 1/165 348/148 |
| 2013/0335553 A1* | 12/2013 | Heger | B62D 15/0285 348/118 |
| 2014/0055615 A1* | 2/2014 | Chen | B62D 15/028 348/148 |
| 2016/0203377 A1* | 7/2016 | Irie | G08G 1/168 348/118 |
| 2016/0214536 A1* | 7/2016 | Burdge | B60R 1/007 |

FOREIGN PATENT DOCUMENTS

| | | |
|---|---|---|
| EP | 2851870 A1 | 3/2015 |
| KR | 2013/0095985 A | 8/2013 |

OTHER PUBLICATIONS

Simultaneous estimation of egomotion and vehicle distance by using a monocular camera, Science China Information Sciences, May 2014, vol. 57, Issue 5, pp. 110.

* cited by examiner

*Primary Examiner* — Talha M Nawaz
(74) *Attorney, Agent, or Firm* — David R. Stevens; Stevens Law Group (57) ABSTRACT

The disclosure relates to systems and methods for estimating or determining the motion of a vehicle and/or the distance to objects within view of a rear camera. A method for rear obstacle detection using structure from motion includes identifying image features in a first frame corresponding to features in a second frame, wherein the first frame and the second frame comprise adjacent image frames captured by a rear-facing camera of a vehicle. The method includes determining parameters for a non-planar motion model based on the image features. The method includes determining camera motion based on the parameters for the non-planar motion model.

14 Claims, 9 Drawing Sheets

REAR OBSTACLE DETECTION AND DISTANCE ESTIMATION

TECHNICAL FIELD

The present disclosure relates to obstacle detection and object distance estimation and more particularly relates to object distance estimation with ego-motion compensation using a monocular rear camera for vehicle intelligence.

BACKGROUND

Automobiles provide a significant portion of transportation for commercial, government, and private entities. Autonomous vehicles and driving assistance systems are currently being developed and deployed to provide safety features, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive, navigate, and/or park a vehicle with little or no user input. However, due to the dangers involved in driving and the costs of vehicles, it is extremely important that autonomous vehicles and driving assistance systems operate safely and are able to accurately navigate roads in a variety of different driving environments.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

An automated driving system or driving assistance system may use data from a plurality of sources during decision making, parking, navigation, or driving to determine optimal paths or maneuvers. For example, vehicles may encounter numerous objects, both static and dynamic. On top of detecting and classifying of such objects, the distance to the object can be important information for autonomous or assisted driving or parking. For example, detecting obstacles and estimating the distance to the obstacles is an important duty of an automatic parking system. An intelligent vehicle may need to promptly detect and estimate the distance to the obstacle for a vehicle parking maneuver and emergency braking. A challenge in many scenarios is to determine the height of the object, and to differentiate the moving objects from stationary environment.

In the present application, Applicants disclose systems, methods, and devices for estimating or otherwise determining the motion of a vehicle and/or the distance to objects within view of a rear camera. A system for rear obstacle detection using structure from motion includes an image component, a feature component, a model parameter component, and a motion component. The image component is configured to obtain a series of image frames captured by a monocular camera during movement of a vehicle. The feature component is configured to identify image features in a first frame corresponding to features in a second frame. The first frame and the second frame are adjacent image frames in the series of image frames. The model parameter component is configured to determine parameters for a non-planar motion model based on the image features. The motion component is configured to determine camera motion based on the parameters for the planar motion model.

In one embodiment, images may be gathered from a monochrome or color camera attached to a vehicle. For example, the camera may include a rear camera such as a rear backup camera positioned at a downward angle to provide a view of obstacles to the rear of a vehicle. In one embodiment, a system may use image sparse feature extraction and matching, camera calibration, image perspective transformation, camera motion estimation, image feature height estimation, image-to-real world scale estimation, and distance estimation based on a pinhole camera model to localize objects and determine a motion of a vehicle during parking or driving.

In one embodiment, a pre-computed camera calibration may be performed and corresponding metrics may be stored. For example, the offsets for camera colors, the viewing angle, focal point, or the like may be tested and stored in the rear camera or as part of a system. Based on images captured by the camera (e.g., a rear camera attached to the vehicle), a system may perform vehicle ego-motion estimation. Image features are extracted from neighboring frames and matched. For example, image features for one image may be extracted and matched with features from a previous image frame. A fundamental matrix (such as for a non-planar motion model) may be obtained based on the image features and their correspondence with image features in another image frame. A fundamental matrix may be computed/estimated using use a random sample consensus (RANSAC) method based on the feature correspondences. Feature correspondences may be classified into inliers and outliers and the fundamental matrix for ego-motion is estimated using only inliers because these correspond to stationary features (with respect to the ground). The outliers are either moving with respect to the ground or are invalid features. After the fundamental matrix is created, the ego-motion is estimated by decomposing the parameters of the matrix. Local bundle adjustment may be performed to improve accuracy.

Three-dimensional reconstruction is performed on all sparse feature points using multiple images. Initially, the reconstructed geometry may be based on an unknown scale. However, given a pre-defined close-to-camera area in the image is ground, the height of the far range stationary feature points can be estimated by associating their geometry to the ground feature points. Based on the estimated heights and geometry, the real-world scale for the feature points (e.g. in centimeters or inches) can be determined and applied to the three-dimensional reconstructions. By associating known stationary feature geometry (e.g., the ground) with reconstructed feature locations, the problem is significantly simplified. Thus, the feature distance can be recovered by exploiting the structure-from-motion (SFM) pipeline, as well as the recovery of the missing scale information. The need to explicitly categorize feature points into ground/non-ground using a minimum spanning tree (MST) is thus avoided Further embodiments and examples will be discussed in relation to the figures below.

Figure 1:
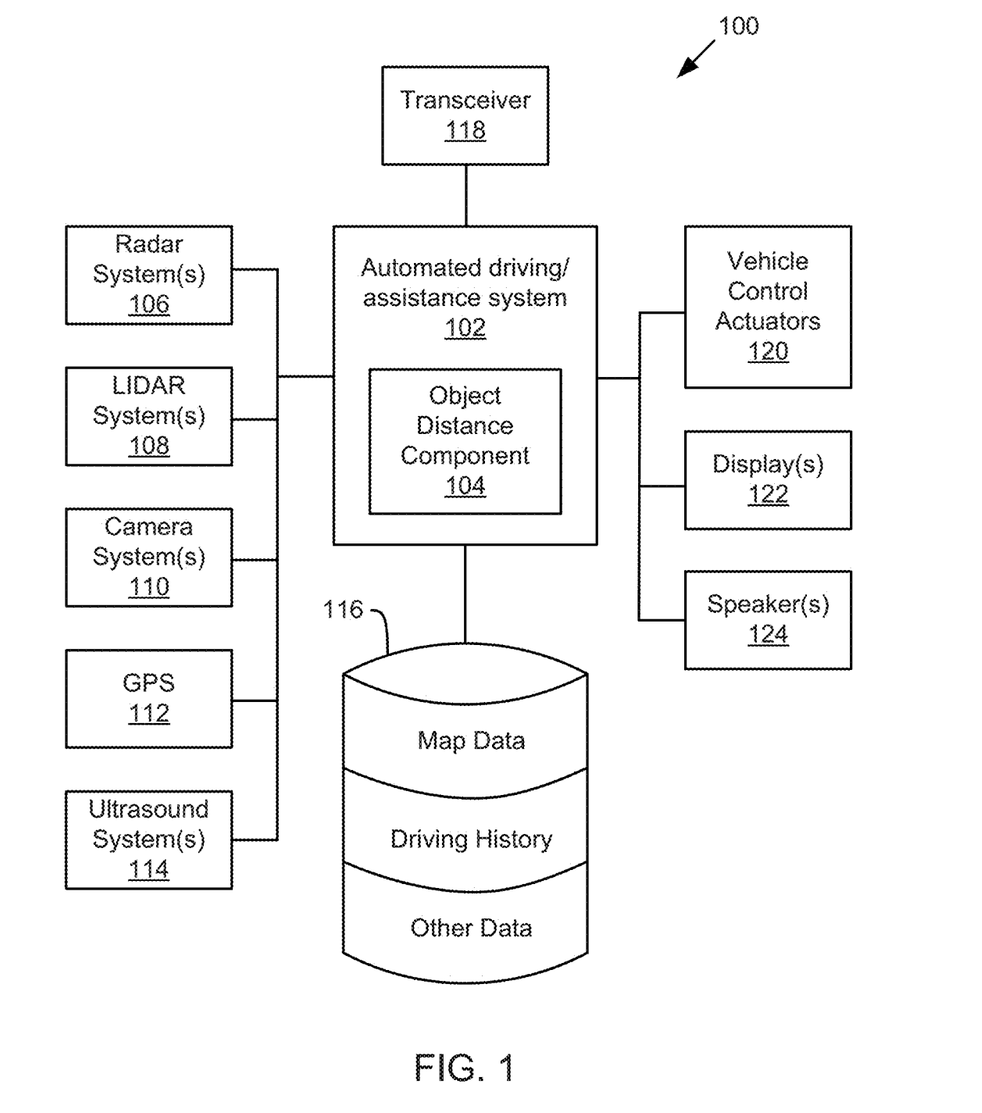
FIG. 1 is a schematic block diagram illustrating an implementation of a vehicle control system that includes an automated driving/assistance system, according to one embodiment.

Referring now to the figures, FIG. 1 illustrates an example vehicle control system 100. The vehicle control system 100 includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other driving or auxiliary systems of the vehicle. In another example, the automated driving/assistance system 102 may not be able to provide any control of the driving (e.g., steering, acceleration, or braking), but may provide notifications and alerts to assist a human driver in driving safely. For example, the automated driving/assistance system 102 may include one or more controllers (such as those discussed herein) that provide or receive data over a controller bus and use the data to determine actions to be performed and/or provide instructions or signals to initiate those actions. The automated driving/assistance system 102 may include an object distance component 104 that is configured to detect and/or determine a speed of movement of a vehicle and/or a distance to an object based on camera data. For example, the object distance component 104 may determine a location and distance to obstacles located behind a vehicle during a parking procedure or during driving in reverse.

The vehicle control system 100 also includes one or more sensor systems/devices for detecting a presence of nearby objects, lane markers, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data for navigation and safety such as map data, a driving history (i.e., drive history), or other data. The vehicle control system 100 may also include a transceiver 118 for wireless communication with a mobile or wireless network, other vehicles, infrastructure, cloud or remote computing or storage resources, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. In one embodiment, the automated driving/assistance system 102 also uses information stored in a driving history (locally or remotely) for determining conditions in a current environment. The automated driving/assistance system 102 may implement one or more algorithms, applications, programs, or functionality that drive or assist in driving of the vehicle.

In one embodiment, the camera systems 110 include a rear facing camera that is directed toward a region behind the vehicle. Often, rear facing cameras or parking cameras are angled downward to provide a view of nearby objects and/or the ground. The camera systems 110 may include cameras facing in different directions to provide different views and different fields of view for areas near or around the vehicle. For example, some cameras may face forward, sideward, rearward, at angles, or in any other direction.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
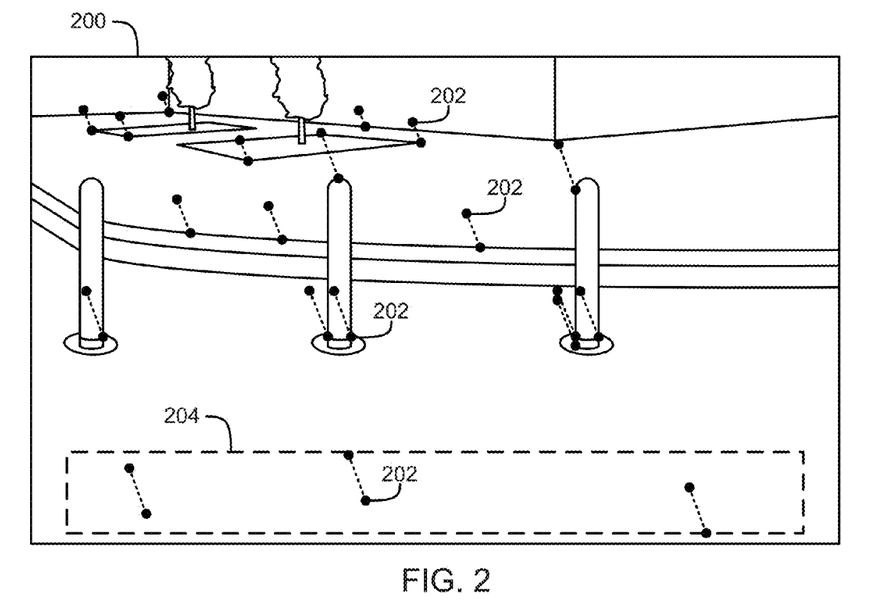
FIG. 2 illustrates a perspective view of an example driving environment.
Figure 3:
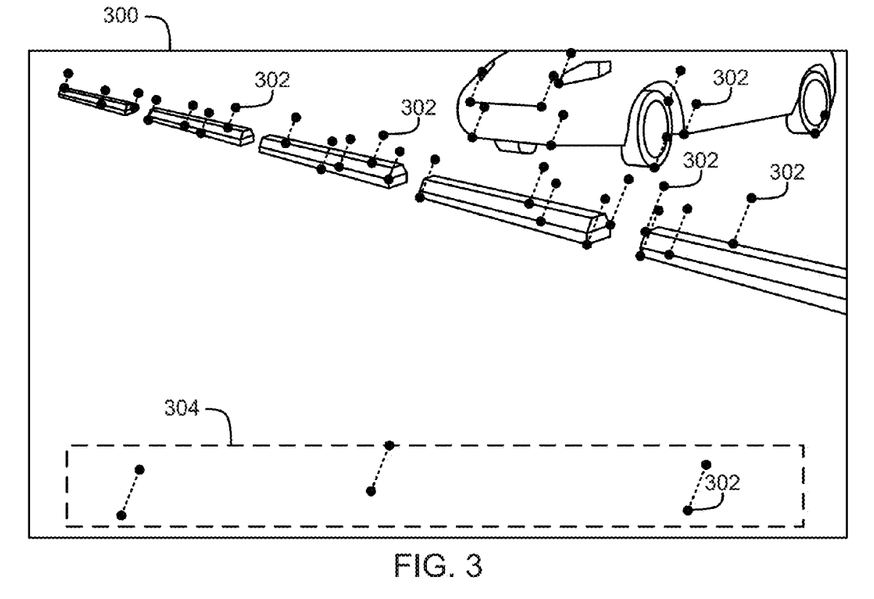
FIG. 3 illustrates a perspective view of another example driving environment.

FIG. 2 illustrates an image 200 providing a perspective view of a scene behind a vehicle that includes bollard receivers and a curb, according to one embodiment. The view illustrates what may be captured in an image by a camera of a vehicle that is backing up in a parking lot or roadway. FIG. 3 illustrates an image 300 providing a perspective view of a parking area with a plurality of parking chocks or parking barriers and a vehicle. The view illustrates what may be captured in an image by a camera backing into or out of a parking space, for example. FIG. 2 includes dotted lines 202, which represent movement of detected features between the image 200 and a previous image. Similarly, FIG. 3 includes dotted lines 302, which represent movement of detected features between the image 300 and a previous image. In one embodiment, the object distance component 104 may use one or more of the scale-invariant feature transform (SIFT) algorithm, the speeded-up robust features (SURF) algorithm, and/or the fast and rotated brief (ORB) algorithm for detecting and correlating features within images. In one embodiment, the object distance component 104 performs image feature extraction for a current frame (e.g., 200 or 300) and an image previous to a current frame. The object distance component 104 may identify the features and correlate features in different images with each other. For example, the dotted lines 202 extend between a point that indicates a current location of the feature (i.e., in image 200) and a location for the feature in a previous image.

In one embodiment, the beginning and end points for each dotted line 202, 302 as well as the distance between the points may correspond to a distance traveled by an object or feature between images. In one embodiment, the positions and/or distance travelled by the points may be used to populate a motion model. For example, the object distance component 104 may populate a matrix or fields for a non-planar motion model based on the positions and/or distances travelled. For rear-view images and/or for parking, the objects of concern may include nearby objects. Furthermore, rear-view or back-up cameras are also angled downward to provide a good view of the ground. Because images will likely include nearby objects, a greater percent variation in distance may be present and thus only non-planar motion models may be used. For example, only non-planar motion models may be able to adequately account for images that include a nearby ground region as well as parking obstacles such as cars or curbs.

FIGS. 2 and 3 also illustrate reference regions 302, 304 that include a region of a ground/driving surface near the vehicle. For example, the reference regions 302, 304 may include regions that are likely to include a ground region near the rear of a vehicle. The reference regions 302, 304, and any features detected in those regions, may be used as reference for other features. For example, it may be assumed that the reference regions 302, 304 include the ground near the vehicle and that the ground region is a specific distance away from the camera. Because the distance is known and other camera parameters are known, the size, distance, or movement of features in that region can be directly calculated. Those values may be used as a reference to determine the size and scale of other detect objects or obstacles not in the reference regions 302, 304.

As will be understood by one of skill in the art FIGS. 2 and 3 are given by way of illustration. Additionally, dotted lines 202, 203 are given by way of example only and do not necessarily represent the features and/or correlations which may be identified. For example, a larger number of features, additional features, or different features may be detected and correlated in practice.

Figure 4:
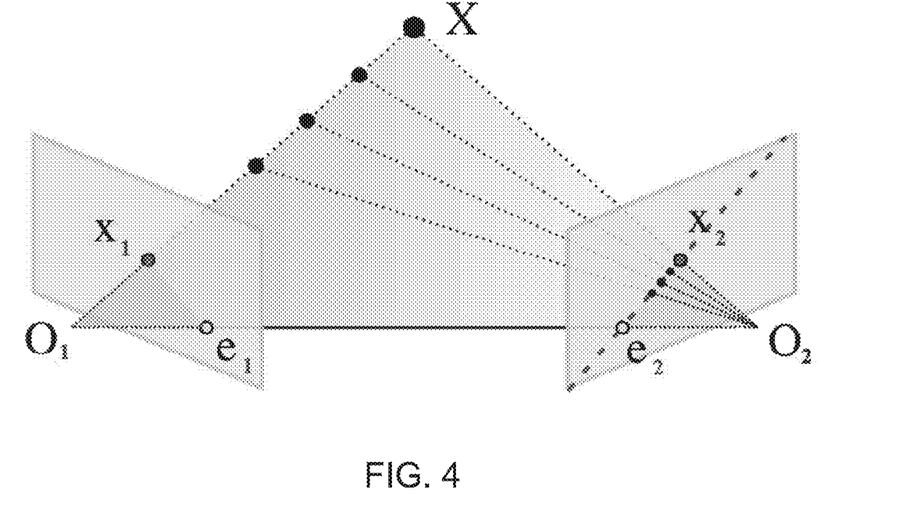
FIG. 4 is a schematic diagram illustrating an epipolar geometry model to determine a fundamental matrix, according to one embodiment.

FIG. 4 is a diagram illustrating operation and/or calculation of a non-planar motion model. Non-planar motion models are used to approximate movement when feature points are located in three-dimensional space, and not located in or on approximately the same plane. For example, in images where there is a large amount of variation in depth or distance from the camera, non-planar motion models may most accurately estimate motion of the ego-camera or ego-vehicle. Equation 1 below illustrates a transformation for a fundamental matrix using epipolar geometry, which may be used for a non-planar motion model. It will be understood that F represents a fundamental matrix and can be solved for using the 8-points linear method or 8-points non-linear method.

$$x_2^T F x_1 = 0 \qquad \text{Equation 1}$$

Figure 5:
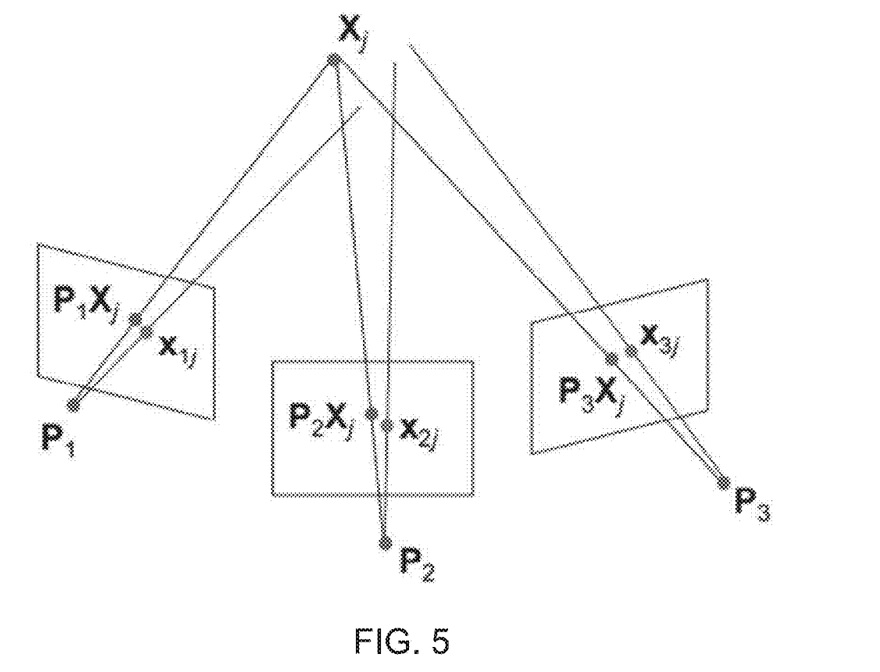
FIG. 5 is a schematic diagram illustrating temporal local bundle adjustment, according to one embodiment.

In one embodiment, temporal local bundle adjustment may be used to improve accuracy of feature correlation and/or parameter data for a fundamental matrix (e.g., a matrix for a 3-dimensional motion model). For example, noise from a camera image, error(s) in feature matching, and/or error in motion estimation can lead to inaccuracies in parameter data, motion estimation, and/or distance estimations for an object. Because the system has a plurality of frames, e.g., as part of a video or series of images captured by a camera, the system can perform bundle adjustment by incorporating temporal information from other image frames. For example, instead of just estimating motion from two consecutive frames, the system can incorporate information for a feature or object from a lot of frames within a time period (e.g., 1 or 2 seconds) to create average or filtered location or movement data to obtain information with reduced noise or lower the error. FIG. 5 and Equation 2 below illustrate one embodiment for temporal local bundle adjustment. For example, the filtered distance to a point or feature in an image may be computed by solving for D.

$$E(P,X) = {}_1\Sigma_{i=1}{}^m \Sigma_{j=1}{}^n D(x_{ij}, P_i X_j)^2 \qquad \text{Equation 2}$$

Figure 6A:
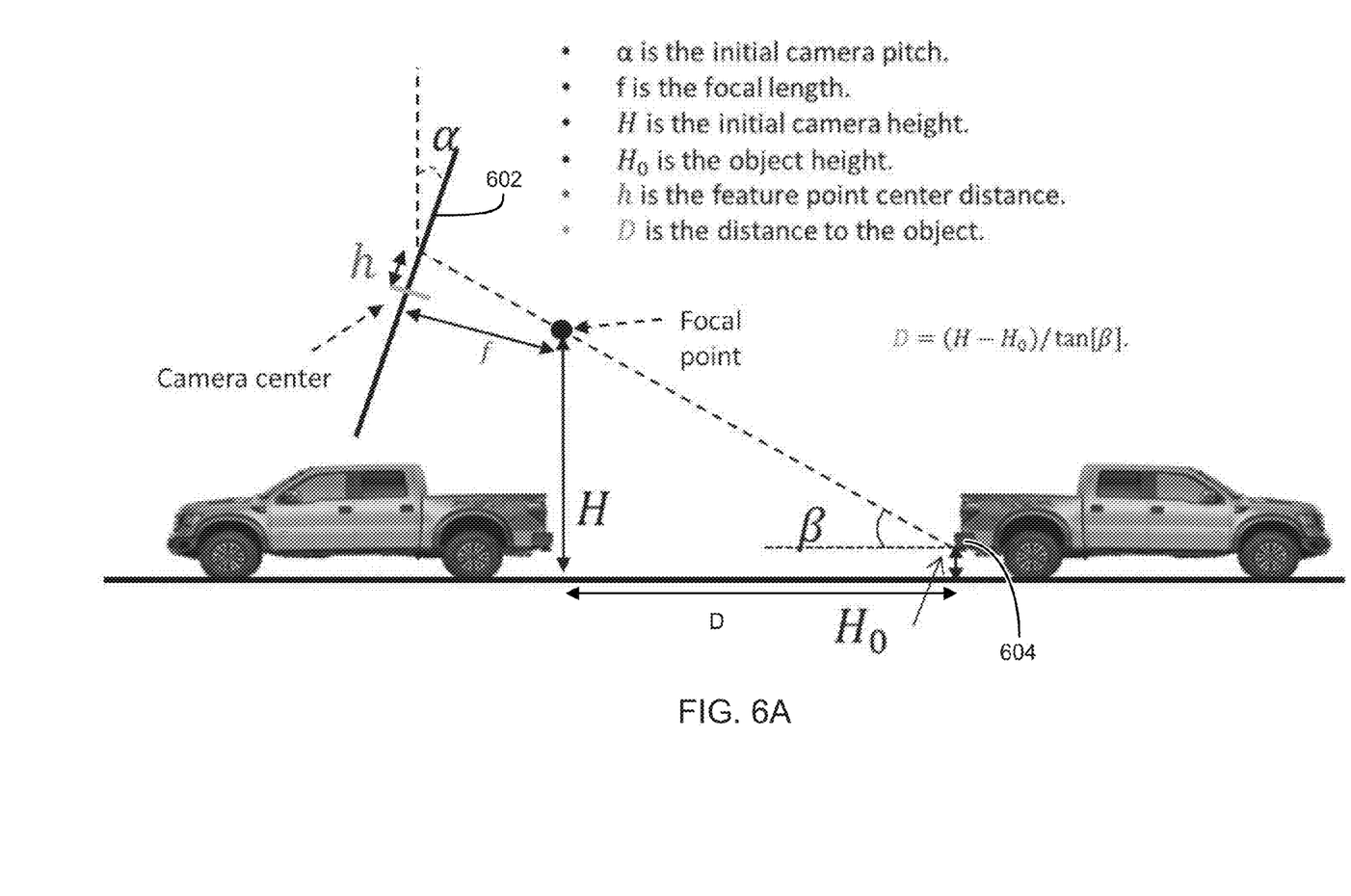
FIG. 6A is a diagram illustrating distance estimation, according to one embodiment.
Figure 6B:
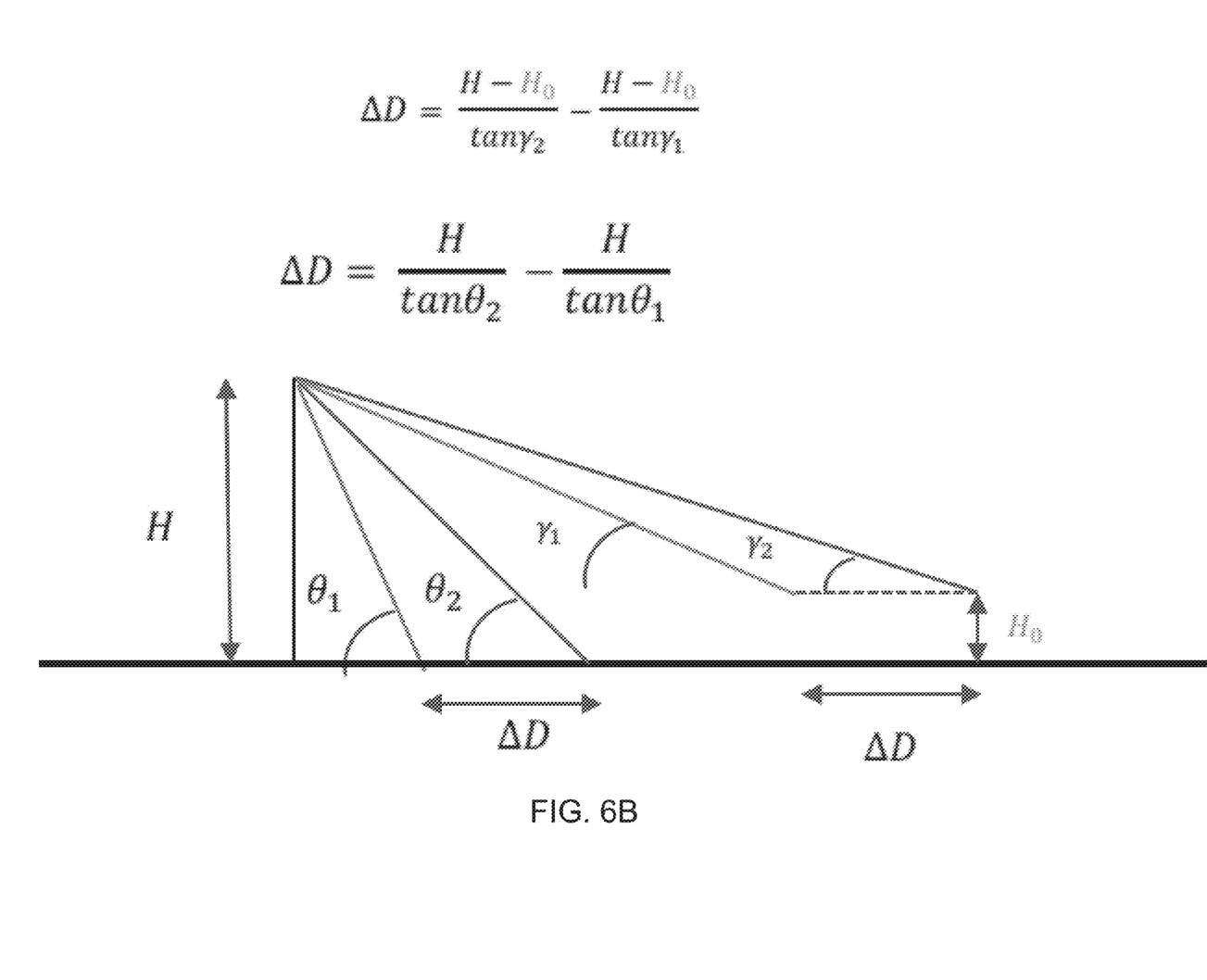
FIG. 6B is another diagram illustrating distance estimation, according to one embodiment.

FIG. 6 is a diagram illustrating parameters for distance estimation, according to one embodiment. An image sensor 602 of a camera is represented by a plane on which an image is formed. According to one embodiment, a distance between an obstacle 604 and the camera or image sensor 602 may be computed using Equation 4 below.

$$D = (H + \Delta h)\tan\left[\frac{\pi}{2} - \alpha - \theta - \tan^{-1}\frac{h}{f}\right] - \Delta d \qquad \text{Equation 3}$$

The terms of Equation 4 and FIG. 6 are as follows: α represents the initial rear camera pitch with respect to the ego-vehicle (e.g., as mounted); f is the focal length for the rear camera; H is the initial rear camera height (e.g., as mounted); Δd is the rear camera to head distance (e.g., the distance between the focal point and the ground contact for the obstacle 604); θ and Δh are obtained using the motion estimation from a non-planar motion model (θ represents the pitch of the vehicle and Δh represents the change in height for the object on the sensor); h is the contact point center distance (e.g., the distance between a specific pixel and the vertical sensor of a sensor array; and D is the distance to the object (e.g., distance to the ground contact point of the object).

In one embodiment, the distance is calculated for each object or obstacle that has a height above a threshold. For example, a threshold height specific to the vehicle (e.g., such as 4 inches, 6 inches, or other height) may be stored. Based on three-dimensional reconstruction of a scene, the objects with feature points at or above that threshold height are identified and then the distance to a ground contact location or other portion of an obstacle is calculated.

Figure 7:
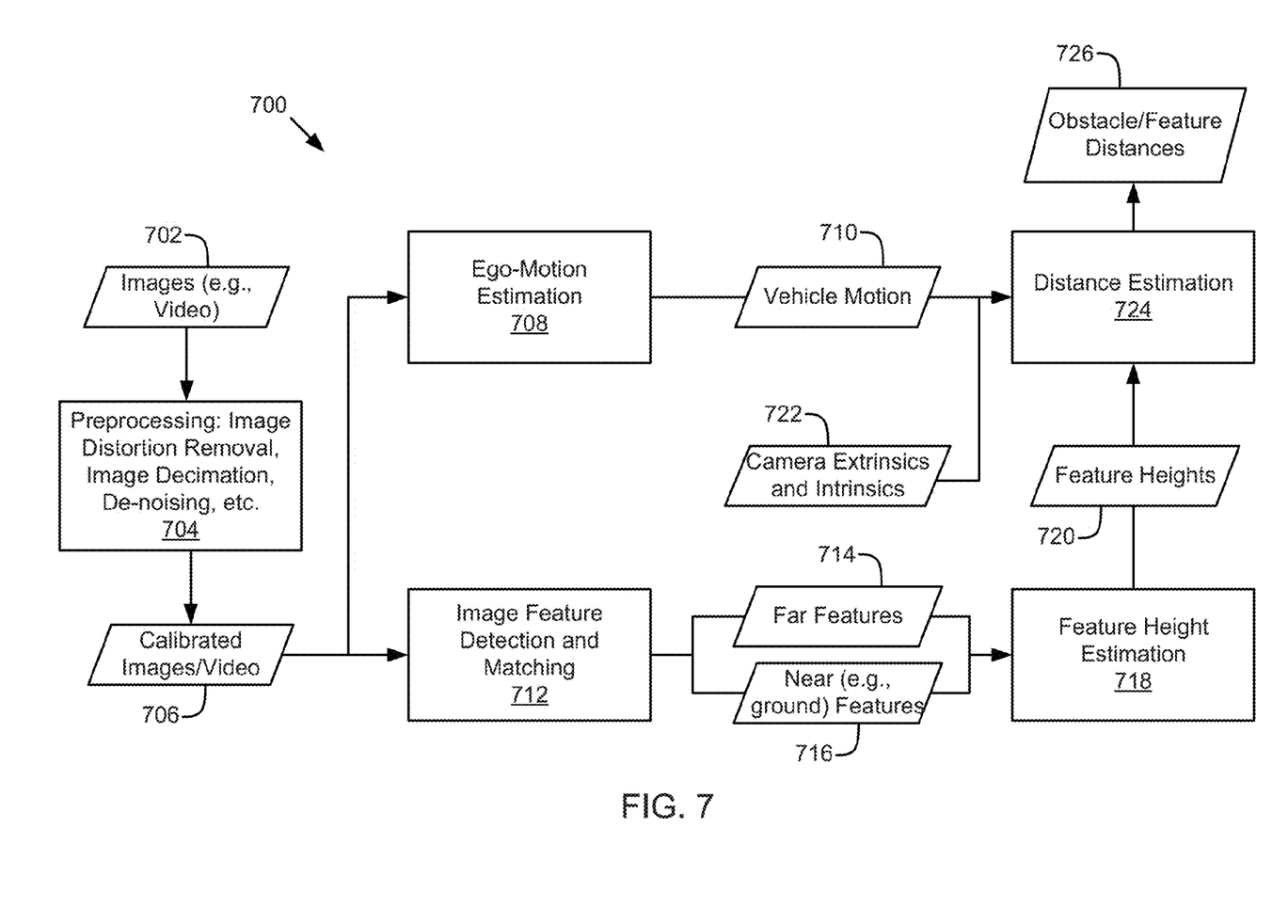
FIG. 7 is a schematic block diagram illustrating data flow for a method of determining distance to an object, according to one embodiment.

FIG. 7 is a schematic block diagram illustrating data flow for a method 700 of determining distance to an object or obstacle to the rear of a vehicle based on a series of camera images. Images 702, such as images from a video feed, are provided for object detection 704. In one embodiment, object detection 704 detects objects within an image. For example, object detection 704 may produce an indication of a type or class of object and its two-dimensional location within each image. In one embodiment, object detection 704 is performed using a deep neural network into which an image is fed. Object detection 704 may result in an object two-dimensional location 706 for one or more objects. In one embodiment, pixels with a similar two-dimensional location, color, and/or intensity and that have feature points that move together may be identified as part of the same object.

The images 702 are also provided for ego-motion estimation 708. Ego-motion estimation may include feature extraction and correlation, estimated vehicle motion, sparse feature points reconstruction, and local bundle adjustment, as discussed herein. In one embodiment, ego-motion estimation 708 may result in information about vehicle motion 710. The information about vehicle motion 710 may include information such as a distance traveled between frames or other indication of speed. The information about vehicle motion 710 may include information such as an offset angle for the camera, such as a tilt of the vehicle with respect to the road based on road slope at the location of the ego-vehicle or a reference object.

Distance estimation 712 is performed based on the vehicle motion and object two-dimensional location 706. For example, distance estimation 712 may compute the distance between an ego-camera or ego-vehicle and an image feature or object. In one embodiment, distance estimation may be performed by correlating a pixel location of an object as determined through object detection 704 with a distance computed as shown and described in relation to FIG. 6. Distance estimation 712 may result in an object distance 714 for a specific object detected during object detection 704. Based on the object distance and the object height, a control system of a vehicle such as the automated driving/assistance system 102 of FIG. 1, may make driving and/or collision avoidance decisions. For example, small objects or bumps on a ground surface may not affect driving while curbs, bollards, vehicles, or other larger objects are avoided.

Figure 8:
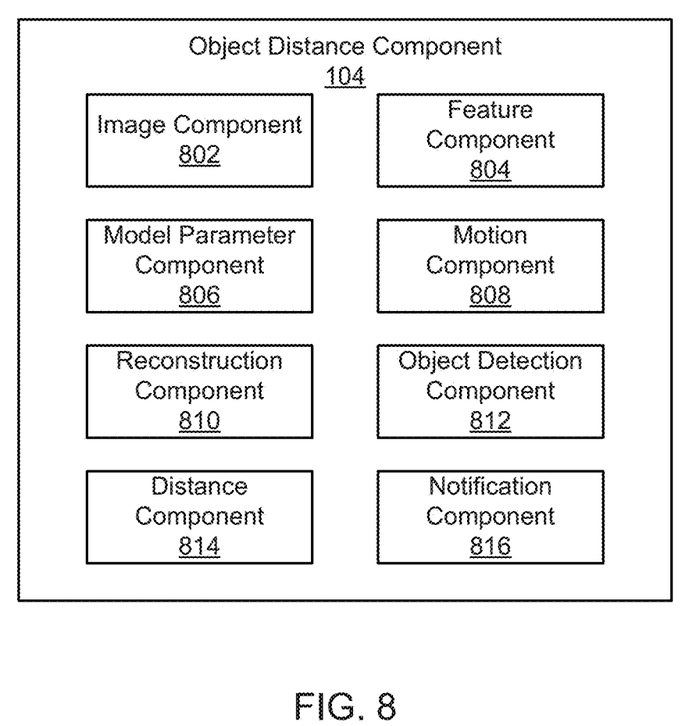
FIG. 8 is a schematic block diagram illustrating example components of an object distance component, according to one implementation.

Turning to FIG. 8, a schematic block diagram illustrating components of an object distance component 104, according to one embodiment, is shown. The object distance component 104 includes an image component 802, a feature component 804, a model parameter component 806, a motion component 808, a reconstruction component 810, an object detection component 812, distance component 814, and a notification component 816. The components 802-816 are given by way of illustration only and may not all be included in all embodiments. In fact, some embodiments may include only one or any combination of two or more of the components 802-816. For example, some of the components 802-816 may be located outside the object distance component 104, such as within the automated driving/assistance system 102 or elsewhere.

The image component 802 is configured to obtain and/or store images from a camera of a vehicle. For example, the images may include video images captured by a monocular camera of a vehicle. The images may include images from a rear-facing camera of a vehicle, such as a back-up camera or rear-view camera. The images may be stored and/or receives as a series of images depicting a real-time or near real-time environment in front of or near the vehicle.

The feature component 804 is configured to detect image features within the images. The image features may include pixels located at high contrast boundaries, locations with high frequency content, or the like. For example, the boundaries of an object often have a high contrast with respect to a surrounding environment. Similarly, multi-colored objects may include high contrast boundaries within the same object. Corners of objects or designs on objects may be identified as image features. See, for example the dotted lines 202, 302 of FIGS. 2 and 3. In one embodiment, the feature component 804 detects all features within an image including those above a ground surface. For example, driving surfaces often have a smaller number of features than neighboring structures, shrubbery, or other objects or structures near a road or otherwise in view of a vehicle camera. However some ground surfaces features, such as rocks, lane markers, cracks, road surface texture, or the like are also usually detected.

In one embodiment, the feature component 804 correlates features in an image or image frame with features in an adjacent image or image frame in a series of images. For example, during movement of a vehicle a feature corresponding to a corner of a building, vehicle, or other object may be at a different position in adjacent frames. The feature component 804 may correlate a feature corresponding to the corner located at a first position within a first image with a feature correspond to the same corner located at a second position within a second image. Thus, information about the same feature at different locations may be informative for computing the distance the vehicle traveled between the two frames as well as for object tracking. In one embodiment, the feature component 804 may identify and correlate features using an ORB algorithm, a SURF algorithm, an optical flow algorithm, a SIFT algorithm, or the like. In some embodiments, the ORB algorithm provides accurate feature detection and correlation with reduced delay. For example, the SURF algorithm can provide high accuracy but is slow. On the other hand the optical flow algorithm is fast but is prone to large motion errors. Applicants have found that the ORB algorithm provides a small accuracy tradeoff for large speed gains when performing feature selection and matching.

In one embodiment, the feature component 804 also classifies detected features as inliers or outliers. For example, some features may correspond to noise, errors, or even objects that are moving relative to the ground. Example objects or obstacles that may move include pedestrians, a ball, rain, hail, or the like. The feature component 804 may use the RANSAC algorithm to classify features as inliers or outliers. For example, the feature component 804 may identify feature points as outliers if they do not fit within a model that will be used for estimating motion. For example, a model may represent how fixed objects move relative to the vehicle. If there are feature points that are erroneous or correspond to moving objects, these feature points may be classified as outliers and thus may be omitted from processing steps (such as for determining model parameters or vehicle motion).

In one embodiment, when feature identification and matching has been performed the feature component 804 may reduce the noise or error by performing local bundle adjustment on image the features. For example, temporal information from a plurality of image frames (e.g., all image frames within one second or other time period) may be used to compute a location for a feature in an image frame that provides for reduced noise, smoother motion, and/or reduced error.

The model parameter component 806 is configured to determine parameters for a motion models. For example, the model parameter component 806 may determine parameters for a non-planar motion model based on the image features, and the distance between correlated image features as determined by the feature component 804. The model parameter component 806 may populate a parameter matrix for the available motion model. For example, the model parameter component 806 may populate a fundamental matrix for a non-planar motion model. The values for the parameters may be computed based on the locations of features and distances between corresponding features between adjacent images. In one embodiment, the model parameter component 806 omits features that are classified as outliers during the determination for the parameters. For example, only features classified by a RANSAC algorithm as inliers may be used by the model parameter component 806 in determining parameters for a fundamental matrix for a non-planar motion model.

The motion component 808 is configured to determine camera motion based on parameters for the selected motion model. For example, the motion component 808 may calculate a distance traveled by the camera (and corresponding vehicle) between the times when two consecutive images were captured. In one embodiment, the motion component 808 calculates θ, Δh, and/or Δd as shown and described in relation to FIG. 6 and Equation 3. In one embodiment, the motion component 808 determines movement of the vehicle solely based on image data from a single monocular camera. In one embodiment, the motion information may be used for distance estimation, obstacle avoidance, or other processing or decision making to be performed by a vehicle control system, such as an automated driving/assistance system 102.

The reconstruction component 810 is configured to reconstruct a three-dimensional scene based on the motion model. In one embodiment, the reconstruction component 810 is configured to reconstruct three-dimensional sparse feature points based on the motion model. The reconstructed scene may include points corresponding to features detected by the feature component 804. In one embodiment, the scene may be reconstructed using an unknown scale. For example, the scene may be constructed using unit distances that are unknown or may be later assigned. In one embodiment, the reconstruction component 810 determines a scale for location of the feature points in three-dimensional space based on feature points within a predefined ground area. For example, distances to features within the reference regions 302, 304 of FIGS. 2-3 may be computed based on a known height of the vehicle as well as camera calibration parameters. With these known values, the distances, height, and scale of other objects or obstacles can also be computed.

With the computed/estimated scale and reconstructions of the three-dimensional scene, the distance to any feature point and corresponding article can be determined. In one embodiment, the distance to each feature point above a threshold height from the ground is determined. In one embodiment, the reconstructed scene may then be used for distance estimation, obstacle avoidance, or other processing or decision making to be performed by a vehicle control system, such as an automated driving/assistance system 102.

The object detection component 812 is configured to detect objects within images obtained or stored by the image component 802. For example, the object detection component 812 may process each image to detect objects such as vehicles, pedestrians, animals, cyclists, road debris, road signs, barriers, or the like. The objects may include stationary or moving objects. In one embodiment, the object detection component 812 may also classify an object as a certain type of object. Example object types may include a stationary object or mobile object. Other example object types may include vehicle type, animal, road or driving barrier, pedestrian, cyclist, or any other classification or indication of object type.

In one embodiment, the object detection component 812 also determines a location for the object such as a two-dimensional location within an image frame or an indication of which pixels correspond to the object. In one embodiment, the object detection component 812 may correlate a detected object with one or more features detected by the feature component 804. For example, all of the features that fall within a region corresponding to the object may be identified as corresponding to that object. Thus distances, movement, or other characteristics of that object may be correlated to the features and distances, movement, or other characteristics of the features may be correlated to the corresponding object.

In one embodiment, based on the two-dimensional location of the objects and feature points, the object detection component may determine a height or other dimension of an object. For example, the object detection component 812 may determine a maximum height, a maximum width, or the like of a corresponding object and/or feature points corresponding to the object. In one embodiment, the object detection component 812 may identify objects or obstacles that have a height above a threshold so that the objects that can't be driven over are avoided during parking, driving, or the like.

The distance component 814 is configured to determine a distance between a camera or ego-vehicle and an object. For example, the distance component 814 may calculate the distance D of Equation 3 based on the motion model and corresponding parameters and motion information. The distance information may be used for obstacle avoidance, automatic parking, or other processing or decision making to be performed by a vehicle control system, such as an automated driving/assistance system 102. In one embodiment, the distance component 814 may determine a distance to the one or more objects or obstacles having a height above a threshold. For example, obstacles above a certain height may be avoided during parking while other objects (such as lines, or debris) may be driven over in at least some situations.

The notification component 816 is configured to notify a driver or automated driving/assistance system 102 of the presence of objects. For example, the notification component 816 may notify a driver that an obstacle is present behind the vehicle. This information may help the driver to park the vehicle without impacting the obstacle. The notification may provide details about the obstacle, such as its identity (e.g., a pedestrian, child, vehicle, curb, or the like), its height, and/or its distance from the vehicle. This information may be used by the driver or automated driving/assistance system 102 to park or drive the vehicle in a manner such that impact with the obstacle is avoided.

Figure 9:
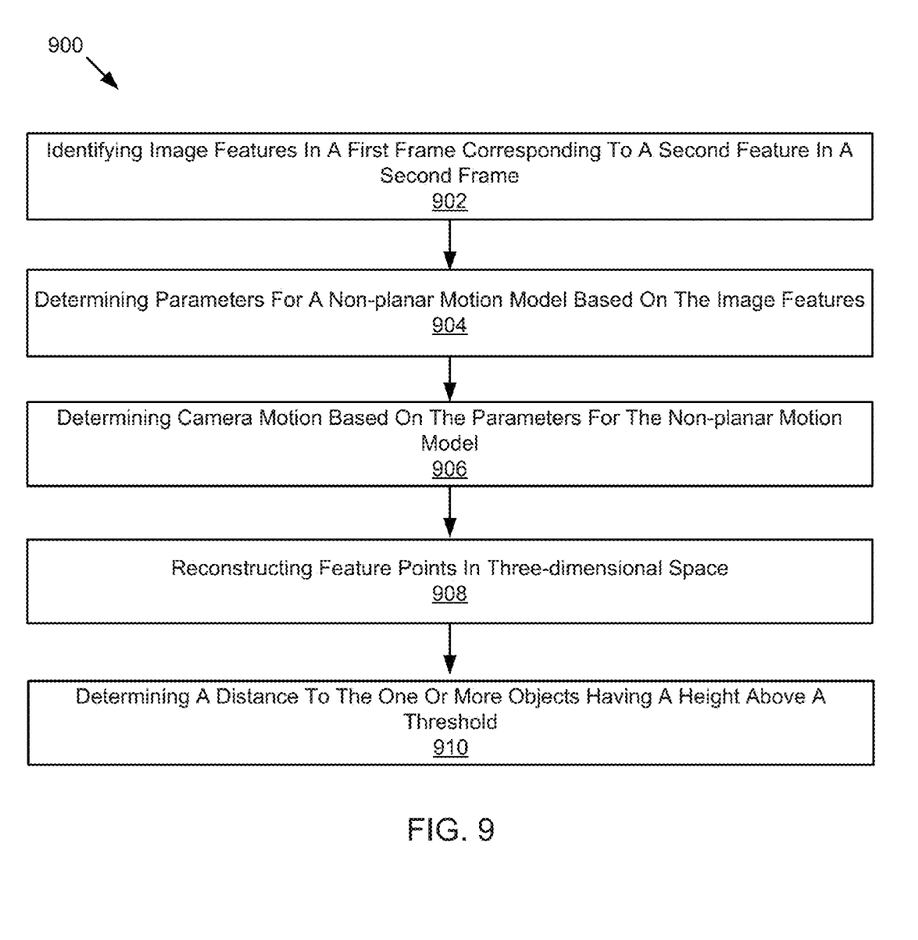
FIG. 9 is a schematic block diagram illustrating a method for determining camera/vehicle motion, according to one implementation.

FIG. 9 is a schematic flow chart diagram illustrating a method 1000 for determining motion of a vehicle. The method 900 may be performed by an object distance component such as the object distance component 104 of FIG. 1 or 8.

The method 900 begins and a feature component 804 identifies 902 image features in a first frame corresponding to features in a second frame. The first frame and the second frame are adjacent image frames captured by a rear-facing camera of a vehicle. The feature component 804 may also classify features are inliers or outliers based how much they move between frames using a RANSAC algorithm. A model parameter component 806 determines 904 parameters for a non-planar motion model based on the image features. A motion component 808 determines 906 camera motion based on the parameters for the non-planar motion model. A reconstruction component 810 reconstructs 908 reconstructing feature points in three-dimensional space. The reconstruction component 810 may also determine a scale for the reconstruction based on feature points and their movement in a reference region (e.g., a region corresponding to ground near a rear of the vehicle). A distance component 814 determines 910 a distance to the one or more objects having a height above a threshold. The distance information may be used during parking or driving to avoid impact with obstacles.

Figure 10:
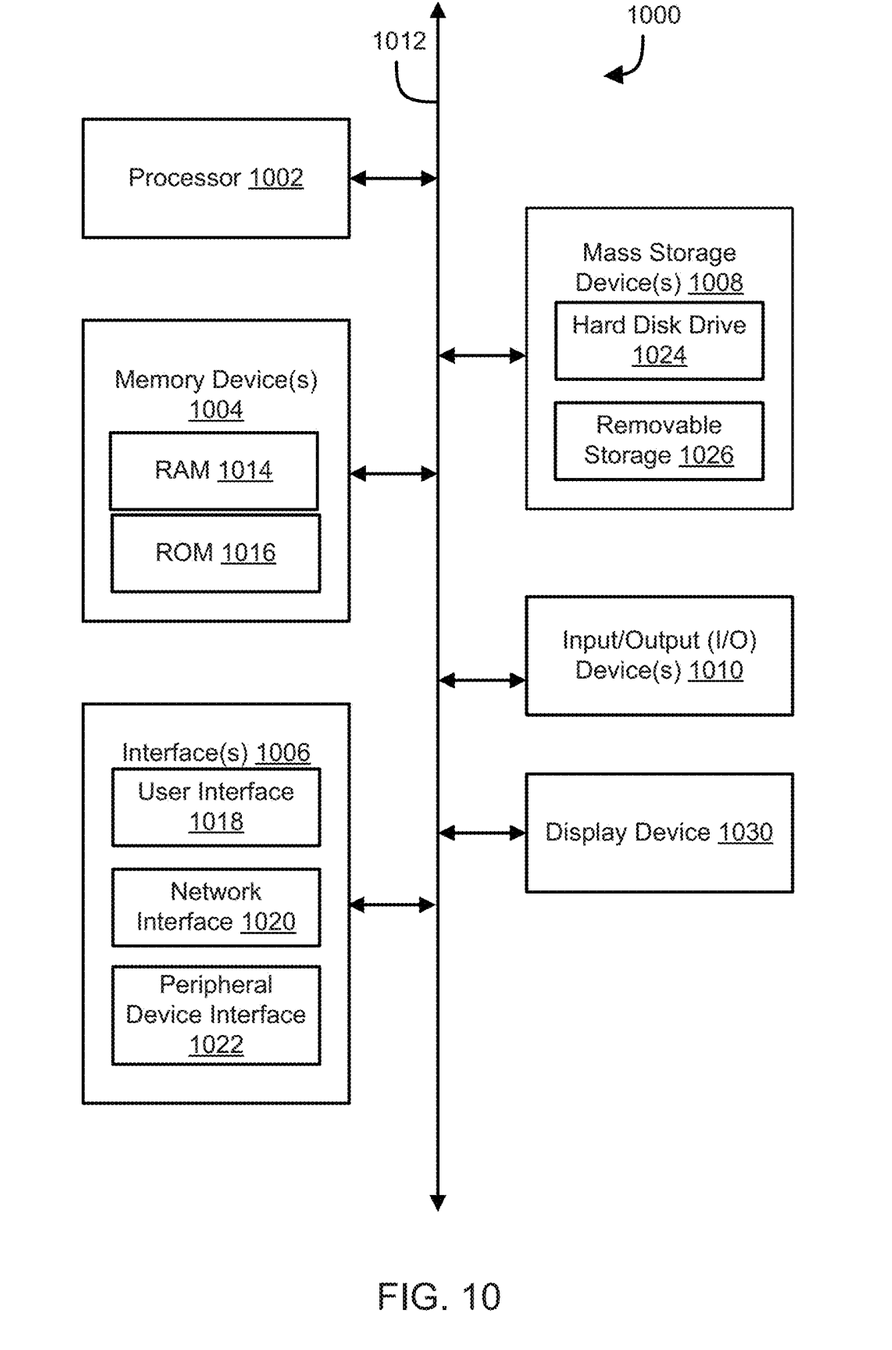
FIG. 10 is a schematic block diagram illustrating a computing system, according to one implementation.

Referring now to FIG. 10, a block diagram of an example computing device 1000 is illustrated. Computing device 1000 may be used to perform various procedures, such as those discussed herein. Computing device 1000 can function as an object distance component 104, automated driving/assistance system 102, server, or any other computing entity. Computing device 1000 can perform various monitoring functions as discussed herein, and can execute one or more application programs, such as the application programs or functionality described herein. Computing device 1000 can be any of a wide variety of computing devices, such as a desktop computer, in-dash computer, vehicle control system, a notebook computer, a server computer, a handheld computer, tablet computer and the like.

Computing device 1000 includes one or more processor(s) 1002, one or more memory device(s) 1004, one or more interface(s) 1006, one or more mass storage device(s) 1008, one or more Input/Output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 10, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 may include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more user interface elements 1018. The interface(s) 1006 may also include one or more peripheral interfaces such as interfaces for printers, pointing devices (mice, track pad, or any suitable user interface now known to those of ordinary skill in the field, or later discovered), keyboards, and the like.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1000, and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for rear obstacle detection using structure from motion. The method includes identifying image features in a first frame corresponding to features in a second frame, wherein the first frame and the second frame comprise adjacent image frames captured by a rear-facing camera of a vehicle. The method includes determining parameters for a non-planar motion model based on the image features. The method includes determining camera motion based on the parameters for the non-planar motion model.

In Example 2, the method of Example 1 further includes identifying one or more feature points as part of a same object based on one or more of a pixel intensity or two-dimensional location within the first frame or second frame.

In Example 3, the method as in any of Examples 1-2 further includes reconstructing feature points in three-dimensional space and determining a scale for location of the feature points in three-dimensional space based on feature points within a predefined ground area in the first frame and the second frame.

In Example 4, the method as in of Example 3 further includes determining a height of one or more objects based on corresponding feature points.

In Example 5, the method as in any of Examples 3-4 further includes determining a distance to the one or more objects having a height above a threshold.

In Example 6, the method as in Example 5 further includes notifying a driver or automated driving system of a presence of the objects having the height above the threshold.

In Example 7, the method as in any of Examples 1-6 further includes classifying features as inliers and outliers, wherein determining the parameters comprises determining based on the inliers.

In Example 8, the method as in any of Examples 1-7 further includes performing local bundle adjustment on image features for improved accuracy.

Example 9 is a system for rear obstacle detection using structure from motion that includes an image component, a feature component, a model parameter component, and a motion component. The system includes an image component configured to obtain a series of image frames captured by a monocular camera during movement of a vehicle. The feature component is configured to identify image features in a first frame corresponding to features in a second frame, wherein the first frame and the second frame comprise adjacent image frames in the series of image frames. The model parameter component is configured to determine parameters for a non-planar motion model based on the image features. The motion component is configured to determine camera motion based on the parameters for the non-planar motion model.

In Example 10, the system as in Example 9 further includes an object detection component configured to identify one or more feature points as part of a same object based on one or more of a pixel intensity or two-dimensional location within the first frame or second frame.

In Example 11, the system as in any of Examples 9-10 further includes a reconstruction component configured to: reconstruct feature points in three-dimensional space; and determine a scale for location of the feature points in three-dimensional space based on feature points within a predefined ground area in the first frame and the second frame.

In Example 12, the system as in any of Examples 9-10 further includes an object detection component configured to determine a height of one or more objects based on locations of corresponding feature points.

In Example 13, the system as in Example 12 further includes a distance component configured to determine a distance to the one or more objects having a height above a threshold.

In Example 14, the system as in Example 13 further includes a notification component configured to notify a driver or automated driving system of a presence of the one or more objects having the height above the threshold.

In Example 15, the feature component as in any of Examples 9-14 is further configured to classify features as inliers or outliers, wherein the model parameter component is configured to determine the parameters comprises determining based on the inliers.

In Example 16, the feature component as in any of Examples 9-15 is further configured to perform local bundle adjustment on image features for improved accuracy.

Example 17 is a computer readable storage media storing instructions that, when executed by one or more processors, cause the processors to identify image features in a first frame corresponding to features in a second frame, wherein the first frame and the second frame comprise adjacent image frames captured by a rear-facing camera of a vehicle. The instructions further cause the one or more processors to determine parameters for a non-planar motion model based on the image features. The instructions further cause the one or more processors to determine camera motion based on the parameters for the non-planar motion model.

In Example 18, the instructions as in Example 17 further cause the one or more processors to identify one or more feature points as part of a same object based on one or more of a pixel intensity or two-dimensional location within the first frame or second frame.

In Example 19, the instructions as in any of Examples 17-18 further cause the one or more processors to: reconstruct feature points in three-dimensional space; and determine a scale for location of the feature points in three-dimensional space based on feature points within a predefined ground area in the first frame and the second frame.

In Example 20, instructions as in any of Examples 17-19 further cause the one or more processors to determining a height of one or more objects based on corresponding feature points.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer.

Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for rear obstacle detection using structure from motion, the method comprising:
   identifying image features in a first frame corresponding to features in a second frame, wherein the first frame and the second frame comprise adjacent image frames captured by a rear-facing camera of a vehicle;
   determining parameters for a non-planar motion model based on the image features;
   generating a three-dimensional reconstruction of feature points of the image features based on the non-planar motion model;
   determining a height of one or more objects based on corresponding feature points of the feature points;
   determining a distance to the one or more objects having a height above a threshold;
   determining camera motion based on the parameters for the non-planar motion model; and
   notifying a driver or automated driving system of a presence of the one or more objects having the height above the threshold.

2. The method of claim 1, further comprising identifying one or more feature points as part of a same object based on one or more of a pixel intensity or two-dimensional location within the first frame or second frame.

3. The method of claim 1, further comprising determining a scale for location of the feature points in three-dimensional space based on feature points within a predefined ground area in the first frame and the second frame.

4. The method of claim 1, further comprising classifying features as inliers and outliers, wherein determining the parameters comprises determining based on the inliers.

5. The method of claim 1, further comprising performing local bundle adjustment on image features for improved accuracy.

6. A system for rear obstacle detection using structure from motion, the system comprising:
   a monocular camera of a vehicle; and
   a vehicle controller in communication with the rear-facing camera, wherein the vehicle controller is configured to:
      obtain a series of image frames captured by the monocular camera during movement of the vehicle;
      identify image features in a first frame corresponding to features in a second frame, wherein the first frame and the second frame comprise adjacent image frames in the series of image frames;

determine parameters for a non-planar motion model based on the image features;

generate a three-dimensional reconstruction of feature points of the image features based on the non-planar motion model;

determine a height of one or more objects based on corresponding feature points of the feature points;

determine a distance to the one or more objects having a height above a threshold;

determine camera motion based on the parameters for the non-planar motion model; and notify a driver or automated driving system of a presence of the one or more objects having the height above the threshold.

7. The system of claim 6, wherein the vehicle controller is further configured to identify one or more feature points as part of a same object based on one or more of a pixel intensity or two-dimensional location within the first frame or second frame.

8. The system of claim 6, wherein the vehicle controller is further configured to determine a scale for location of the feature points in three-dimensional space based on feature points within a predefined ground area in the first frame and the second frame.

9. The system of claim 6, wherein the vehicle controller is further configured to classify features as inliers or outliers, wherein determining the parameters comprises determining based on the inliers.

10. The method of claim 6, wherein the vehicle controller is further configured to perform local bundle adjustment on image features for improved accuracy.

11. Non-transitory computer readable storage media storing instructions that, when executed by one or more processors, cause the one or more processors to:

identify image features in a first frame corresponding to features in a second frame, wherein the first frame and the second frame comprise adjacent image frames captured by a rear-facing camera of a vehicle;

determine parameters for a non-planar motion model based on the image features;

generate a three-dimensional reconstruction of feature points of the image features based on the non-planar motion model;

determine a height of one or more objects based on corresponding feature points of the feature points;

determine a distance to the one or more objects having a height above a threshold;

determine camera motion based on the parameters for the non-planar motion model; and notify a driver or automated driving system of a presence of the one or more objects having the height above the threshold.

12. The non-transitory computer readable storage media of claim 11, wherein the instructions further cause the one or more processors to identify one or more feature points as part of a same object based on one or more of a pixel intensity or two-dimensional location within the first frame or second frame.

13. The non-transitory computer readable storage media of claim 11, wherein the instructions further cause the one or more processors to determine a scale for location of the feature points in three-dimensional space based on feature points within a predefined ground area in the first frame and the second frame.

14. The non-transitory computer readable storage media of claim 11, wherein the instructions further cause the one or more processors to classify features as inliers and outliers, wherein determining the parameters comprises determining based on the inliers.

* * * * *